(12) United States Patent
Patterson

(10) Patent No.: US 10,487,951 B2
(45) Date of Patent: Nov. 26, 2019

(54) NON-INTERFLOW DIRECTIONAL CONTROL VALVE

(71) Applicant: Proserv Operations, Inc., Houston, TX (US)

(72) Inventor: Andy Patterson, Katy, TX (US)

(73) Assignee: Proserv Operations, Inc., Houston, TX (US)

( * ) Notice: Subject to any disclaimer, the term of this patent is extended or adjusted under 35 U.S.C. 154(b) by 0 days.

(21) Appl. No.: 15/358,042

(22) Filed: Nov. 21, 2016

(65) Prior Publication Data

US 2017/0211710 A1    Jul. 27, 2017

Related U.S. Application Data

(60) Provisional application No. 62/286,150, filed on Jan. 22, 2016.

(51) Int. Cl.
| | |
|---|---|
| *F16K 11/07* | (2006.01) |
| *F16K 25/00* | (2006.01) |
| *F16K 31/122* | (2006.01) |
| *F16K 11/02* | (2006.01) |
| *F16K 11/065* | (2006.01) |

(52) U.S. Cl.
CPC ........ *F16K 11/0716* (2013.01); *F16K 25/005* (2013.01); *F16K 31/1221* (2013.01); *F16K 11/02* (2013.01); *F16K 11/065* (2013.01); *Y10T 137/86582* (2015.04); *Y10T 137/87249* (2015.04)

(58) Field of Classification Search
CPC .... F16K 11/0716; F16K 11/065; F16K 11/02; F16K 31/1221; Y10T 137/86582; Y10T 137/87249
See application file for complete search history.

(56) References Cited

U.S. PATENT DOCUMENTS

| | | | |
|---|---|---|---|
| 402,600 | A | 5/1889 | Kemp |
| 1,654,642 | A | 1/1928 | Geissinger |
| 2,140,735 | A * | 12/1938 | Clarke ............... F16N 39/00 137/625.48 |
| 2,311,851 | A | 2/1943 | McClure |
| 2,560,841 | A | 7/1951 | Bishop |

(Continued)

FOREIGN PATENT DOCUMENTS

| | | | |
|---|---|---|---|
| CH | 469928 A | 3/1969 | |
| DE | 102014224979 A1 * | 6/2016 | ......... F16K 31/1262 |

OTHER PUBLICATIONS

PCT International Search Report and Written Opinion dated Dec. 1, 2017, for International Application No. PCT/US2017/061567.

(Continued)

*Primary Examiner* — Matthew W Jellett
*Assistant Examiner* — Christopher Ballman
(74) *Attorney, Agent, or Firm* — Patterson + Sheridan, LLP

(57) ABSTRACT

A directional control valve having low or no interflow, minimal parts, and configured for easy repair, is provided. In one embodiment, a seat is slidingly sealably movable with respect to opposed plates, such that an inlet in one of the plates communicates with an internal volume of the seat, and by selectively positioning the seat with respect to one or more outlets in a second of the opposed plates, the inlet can be placed in communication with an outlet, or isolated from the one or more outlets.

12 Claims, 15 Drawing Sheets

(56) References Cited

U.S. PATENT DOCUMENTS

| | | | |
|---|---|---|---|
| 2,605,108 A * | 7/1952 | Stephens | F15B 13/04 |
| | | | 137/596.13 |
| 2,685,296 A | 8/1954 | Boosman | |
| 2,729,226 A | 1/1956 | Jones | |
| 2,799,523 A | 7/1957 | Parker | |
| 2,811,979 A | 11/1957 | Presnell | |
| 2,821,972 A | 2/1958 | Banker | |
| 2,847,027 A * | 8/1958 | Kumpman | F16K 11/18 |
| | | | 137/359 |
| 2,862,520 A * | 12/1958 | Cordova | F16K 11/0565 |
| | | | 137/597 |
| 2,867,463 A | 1/1959 | Snider | |
| 2,892,644 A | 6/1959 | Collins | |
| 2,906,290 A * | 9/1959 | Harding | F16K 11/076 |
| | | | 137/597 |
| 2,973,746 A * | 3/1961 | Jupa | F15B 13/0438 |
| | | | 137/625.6 |
| 3,022,794 A | 2/1962 | Pippenger | |
| 3,114,391 A | 12/1963 | Kurtz | |
| 3,145,723 A | 8/1964 | Chorkey | |
| 3,189,049 A * | 6/1965 | Carlson | F16K 11/0716 |
| | | | 137/625.24 |
| 3,219,060 A * | 11/1965 | Pearl | F15B 13/0402 |
| | | | 137/625.6 |
| 3,225,786 A | 12/1965 | Elliott | |
| 3,316,930 A | 5/1967 | Garduer | |
| 3,352,394 A * | 11/1967 | Longshore | F15B 13/06 |
| | | | 192/109 F |
| 3,421,533 A * | 1/1969 | Conn | F15B 13/022 |
| | | | 137/101 |
| 3,474,828 A * | 10/1969 | Wheeler et al. | F15B 13/0402 |
| | | | 137/625.6 |
| 3,485,225 A | 12/1969 | Bailey et al. | |
| 3,533,431 A | 10/1970 | Kuenzel et al. | |
| 3,536,085 A | 10/1970 | Taplin | |
| 3,540,695 A | 11/1970 | Taylor | |
| 3,587,647 A | 6/1971 | Walters | |
| 3,635,436 A | 1/1972 | Tillman | |
| 3,662,950 A | 5/1972 | McIntosh et al. | |
| 3,683,694 A | 8/1972 | Granberg | |
| 3,749,122 A | 7/1973 | Gold | |
| 3,797,525 A * | 3/1974 | Lieser | F16K 11/02 |
| | | | 137/625.6 |
| 3,949,645 A * | 4/1976 | Masclet | B64C 25/26 |
| | | | 137/625.64 |
| 4,220,174 A * | 9/1980 | Spitz | F16K 11/0708 |
| | | | 137/271 |
| 4,240,634 A | 12/1980 | Wiczer | |
| 4,253,481 A | 3/1981 | Sarlls, Jr. | |
| 4,263,938 A * | 4/1981 | Peters | F16K 11/0716 |
| | | | 137/458 |
| 4,281,677 A | 8/1981 | Hoffman | |
| 4,336,946 A | 6/1982 | Wheeler | |
| 4,396,071 A | 8/1983 | Stephens | |
| 4,444,216 A | 4/1984 | Loup | |
| 4,475,568 A | 10/1984 | Loup | |
| 4,491,154 A * | 1/1985 | Peters | F16K 11/0716 |
| | | | 137/625.26 |
| 4,493,335 A | 1/1985 | Watson | |
| 4,554,940 A | 11/1985 | Loup | |
| 4,793,590 A | 12/1988 | Watson | |
| 4,856,557 A | 8/1989 | Watson | |
| 4,877,057 A * | 10/1989 | Christensen | A62C 5/02 |
| | | | 137/101 |
| 4,890,645 A | 1/1990 | Andersen | |
| 4,968,197 A | 11/1990 | Chen | |
| 5,035,265 A | 7/1991 | Chen | |
| 5,069,240 A | 12/1991 | Kurkjian, Jr. | |
| 5,190,078 A | 3/1993 | Stoll et al. | |
| 5,301,637 A | 4/1994 | Blount | |
| 5,771,931 A | 6/1998 | Watson | |
| 5,797,431 A | 8/1998 | Adams | |
| 5,901,749 A | 5/1999 | Watson | |
| 6,041,804 A | 3/2000 | Chatufale | |
| 6,257,268 B1 | 7/2001 | Hope et al. | |
| 6,264,206 B1 | 7/2001 | Hashizawa et al. | |
| 6,296,008 B1 | 10/2001 | Boyer et al. | |
| 6,318,400 B1 | 11/2001 | Hope et al. | |
| 6,382,256 B2 | 5/2002 | Kim et al. | |
| 6,520,478 B1 | 2/2003 | Hope et al. | |
| 6,523,613 B2 | 2/2003 | Rayssiguier et al. | |
| 6,651,696 B2 | 11/2003 | Hope et al. | |
| 6,702,024 B2 | 3/2004 | Neugebauer | |
| 6,843,266 B2 | 1/2005 | Hope et al. | |
| 6,983,803 B2 | 1/2006 | Watson et al. | |
| 7,000,890 B2 | 2/2006 | Bell et al. | |
| 7,073,590 B2 | 7/2006 | Neugebauer et al. | |
| 7,159,605 B2 | 1/2007 | Thrash, Jr. et al. | |
| 7,520,297 B2 | 4/2009 | Bell et al. | |
| 7,628,170 B2 | 12/2009 | Kok-Hiong et al. | |
| 7,784,553 B2 | 8/2010 | Moreno | |
| 7,959,161 B2 | 6/2011 | Seki et al. | |
| 8,052,119 B2 | 11/2011 | Numazaki et al. | |
| 8,246,055 B2 | 8/2012 | Asplund et al. | |
| 8,342,202 B2 | 1/2013 | Nishio et al. | |
| 8,397,742 B2 | 3/2013 | Thrash et al. | |
| 8,408,244 B2 | 4/2013 | Gilcher | |
| 8,469,059 B1 * | 6/2013 | Forst | F16K 11/0716 |
| | | | 137/595 |
| 8,474,792 B2 | 7/2013 | Kubo et al. | |
| 9,121,244 B2 | 9/2015 | Loretz et al. | |
| 9,297,462 B2 * | 3/2016 | Hattori | F16H 61/00 |
| 9,334,946 B1 * | 5/2016 | Mason | F16H 57/0435 |
| 9,423,031 B2 | 8/2016 | Weintraub et al. | |
| 9,874,282 B2 * | 1/2018 | Wetzel | F16K 3/262 |
| 2004/0173976 A1 | 9/2004 | Boggs | |
| 2004/0262007 A1 | 12/2004 | Neugebauer et al. | |
| 2005/0028864 A1 | 2/2005 | Thrash et al. | |
| 2006/0137744 A1 | 6/2006 | Anastas | |
| 2006/0237064 A1 | 10/2006 | Benson | |
| 2007/0000544 A1 | 1/2007 | Thompson | |
| 2007/0069576 A1 | 3/2007 | Suzuki | |
| 2007/0113906 A1 * | 5/2007 | Sturman | F15B 13/0402 |
| | | | 137/625.65 |
| 2010/0044605 A1 * | 2/2010 | Veilleux | F16K 11/0716 |
| | | | 251/129.06 |
| 2010/0140881 A1 | 6/2010 | Matsuo | |
| 2010/0154896 A1 | 6/2010 | Thrash, Jr. et al. | |
| 2010/0243084 A1 * | 9/2010 | Yoshioka | F16K 31/1221 |
| | | | 137/529 |
| 2011/0253240 A1 | 10/2011 | Otto et al. | |
| 2013/0032222 A1 | 2/2013 | Bresnahan | |
| 2013/0037736 A1 | 2/2013 | Bresnahan | |
| 2013/0146303 A1 | 6/2013 | Gustafson | |
| 2013/0181154 A1 | 7/2013 | Robison et al. | |
| 2014/0116551 A1 * | 5/2014 | Smith | F16K 11/0716 |
| | | | 137/625.69 |
| 2014/0377111 A1 | 12/2014 | Bagagli et al. | |
| 2015/0152959 A1 * | 6/2015 | Mangiagli | F16H 61/029 |
| | | | 137/15.17 |
| 2015/0191996 A1 | 7/2015 | Weintraub | |
| 2015/0191997 A1 | 7/2015 | Weintraub et al. | |
| 2015/0276083 A1 | 10/2015 | Druhan et al. | |
| 2015/0369002 A1 | 12/2015 | Patterson | |
| 2016/0103456 A1 * | 4/2016 | Cho | F16K 31/002 |
| | | | 236/101 R |
| 2016/0123478 A1 * | 5/2016 | Wetzel | F16K 11/07 |
| | | | 251/282 |
| 2016/0258531 A1 | 9/2016 | Ito et al. | |
| 2016/0258537 A1 | 9/2016 | Heiderman et al. | |
| 2017/0037984 A1 * | 2/2017 | Frippiat | B64D 47/00 |
| 2017/0097100 A1 * | 4/2017 | Patterson | F16K 11/0716 |
| 2017/0175916 A1 * | 6/2017 | Huynh | F16K 31/0613 |
| 2017/0189730 A1 * | 7/2017 | Ernfjall | A62C 35/68 |
| 2017/0220054 A1 | 8/2017 | Zhu et al. | |
| 2017/0241563 A1 * | 8/2017 | Simpson | F16K 31/1221 |
| 2017/0260831 A1 * | 9/2017 | Green | E21B 34/066 |

(56) References Cited

U.S. PATENT DOCUMENTS

2017/0314689 A1\* 11/2017 Osterbrink ................ A01J 5/04
2017/0370481 A1\* 12/2017 Glazewski ............ F16K 11/027

OTHER PUBLICATIONS

PCT International Search Report and Written Opinion dated Jan. 31, 2018, for International Application No. PCT/US2017/051550.
PCT International Search Report and Written Opinion dated Jun. 23, 2015, for International Application No. PCT/US2014/062114.

\* cited by examiner

NON-INTERFLOW DIRECTIONAL CONTROL VALVE

CROSS-REFERENCE TO RELATED APPLICATIONS

This application claims benefit of U.S. provisional patent application Ser. No. 62/286,150, filed Jan. 22, 2016, which is herein incorporated in its entirety.

BACKGROUND OF THE INVENTION

Field of the Invention

The present invention relates to the field of flow control valves, including valves used to control fluid flow to and from offshore, i.e., submersed or submersible, oil and gas production equipment.

Description of the Related Art

Metal seated hydraulic directional control valves (DCVs) have been used to control fluid flow to and from offshore and subsea blowout preventers (BOPs) and BOP control systems for a number of decades. In recent years, the oil and gas exploration and production industries have developed a requirement for simplified control systems. In the past, two 3-way 2-position DCVs were used to control the operation of double acting cylinders in BOP's. There is now a need for a simple to operate and to service 4-way, 3-position, closed center DCV which can replace the directional control valves configured of two 3-way 2-position DCVs. There is also a need for simple to operate and to service DCVs, as well as DCVs with low to no interflow and very minimal to zero seat leakage.

SUMMARY OF THE INVENTION

In one aspect, a multi position directional control valve is provided, and includes a housing having a bore therein, and an inlet and at least one outlet communicating with the bore. A seat assembly is located in the bore and is moveable therein between at least a first position wherein the inlet is blocked from communication with the at least one outlet by the position of the seat assembly and a second position wherein the inlet is in fluid communication with a single outlet of the at least one outlet.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Provided herein are embodiments of a 4-way, 3-position directional control valve which is configured to have a small number of parts, be easily serviceable and repairable, to minimize interflow of the fluid streams controlled thereby, and have zero seat leakage. Also provided herein are embodiments of a 3-way, 2-position directional control valve which is configured to have a small number of parts, be easily serviceable and repairable, configured to minimize interflow of the fluid streams controlled thereby, and configured for zero seat leakage. Additionally provided herein are embodiments of directional control valves which are configured to have a small number of parts, and be easily serviceable and repairable. In one aspect, the directional control valve is configured as a mirror image on either side of the center thereof, such that the end caps, biasing elements and seat assembly thereof are all reversible and interchangeable to yield a small number of parts which are difficult to incorrectly assemble, yielding a directional control valve with easy serviceability.

In the embodiments herein, each valve includes an inlet, the flow from, and through the valve, is controlled by selectively pressurizing at least one control piston to allow, or prevent, flow of fluid from the inlet to an outlet of the valve. To enable this, a metal seat assembly is selectively moveable within a seat bore of the valve to communicate a volume surrounded by the metal seat assembly with the inlet, and selectively communicate that same volume with at least one outlet. Each valve embodiment described herein includes at least two biasing force members. In the embodiment herein, the bias force members comprise a pressure biased piston and a spring assembly, wherein the force of the pressure biased piston is opposed by spring force. Both normally open, and normally closed, versions of the valve can be configured using these elements, as is described herein. However, other bias force elements, and combinations thereof, are possible.

Figure 1:
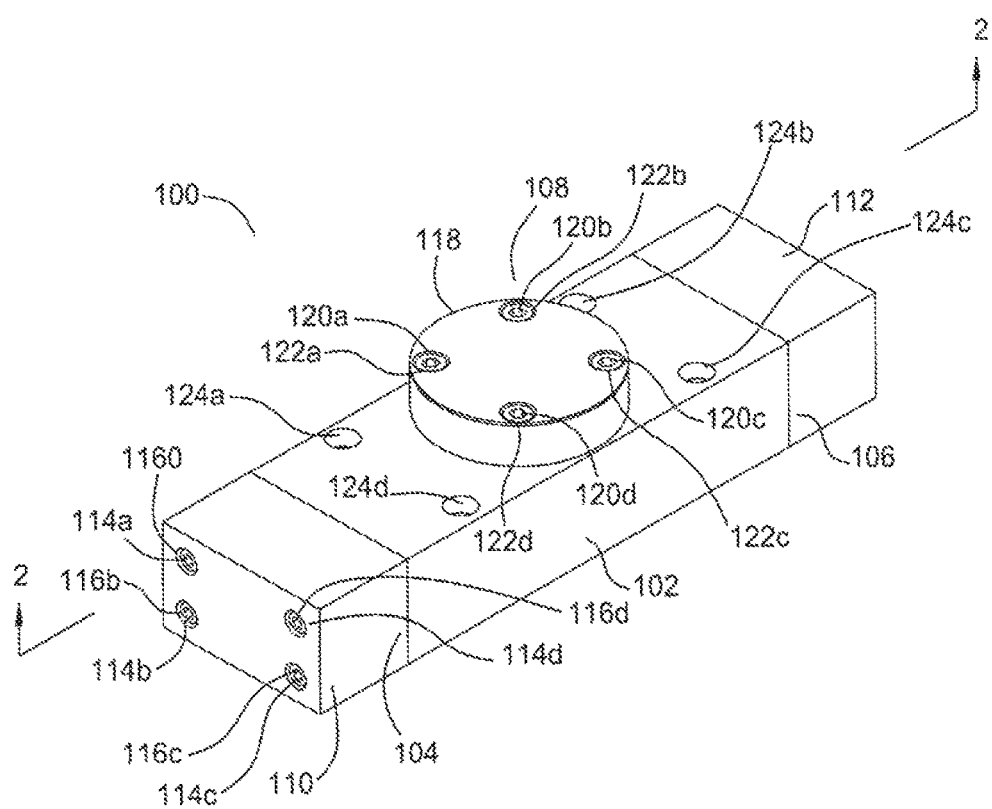
FIG. 1 is a perspective view of a 4-way, 3-position directional control valve.

Referring initially to FIG. 1, the exterior of a non-interflow valve 100 hereof is shown in perspective, and includes a generally elongated, in the embodiment, rectangular in cross section, main body 102, having opposed ends 104, 106 and a central seat region 108. First and second end caps 110, 112 are releasably secured to opposed ends 104, 106, respectively, of the main body 102, and each is secured to the main body 102 by a plurality of threaded fasteners 114*a-d* extending from openings 116*a-d* in the first and second end caps 110, 112 and into corresponding threaded openings (not shown) extending inwardly of the end faces of opposed ends 104, 106 of the main body 102. The openings 116*a-d* are counterbored, such that the heads of the fasteners 114*a-d* are recessed therein and bear against an annular seating face (not shown). A seat cap 118 is positioned over central seat region 108 of the main body 102 and releasably secured thereon by a plurality of threaded fasteners 120*a-d* extending from recessed openings 122*a-d* in the outer face 124 of seat cap 118, and into corresponding threaded openings (not shown) in the main body 102 which are located around the seat region 108. The openings 122*a-d* are counterbored, such that the heads of the fasteners 120*a-d* are recessed therein and bear against an annular face therein (not shown). Additionally, four through holes 124*a-d* extend through the main body 102, and are provided for the receipt of mounting fasteners (not shown) used to secure the valve 100 to a mounting panel (not shown) or other mounting location. The elements of the valve, including the interior configuration of the main body 102 and seat cap 118, as well as the end caps and the internal components of the valve 100 are mirror images to either side of a plane defined by plane indicated by dashed line C-C in FIG. 2.

Figure 2:
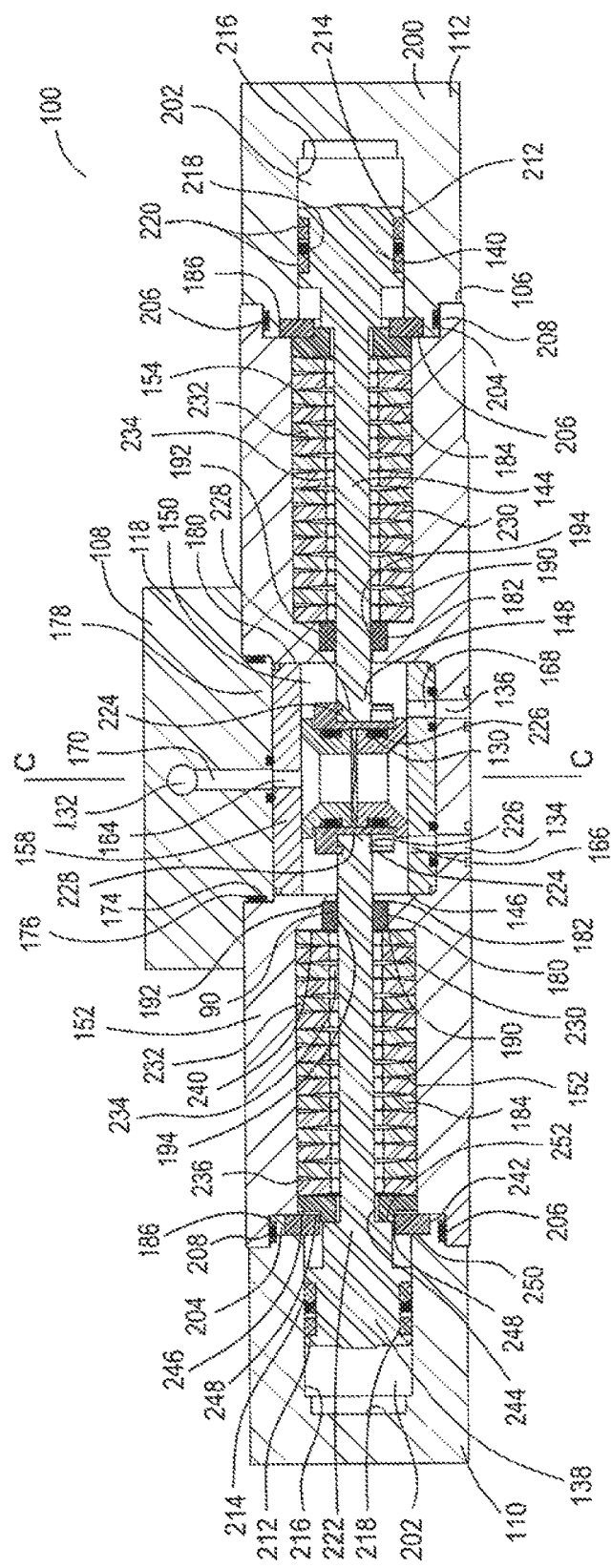
FIG. 2 is a sectional view of the valve of FIG. 1 at section 2-2, wherein the valve is in the closed position.

Referring to FIG. 2, the internal configuration of the valve 100 of FIG. 1 is described, wherein the valve 100 is shown in the closed, and seat assembly centered, position. Generally, the valve 100 is configured to selectively position or bias a metal seat assembly 130, which is configured to shuttle between a plurality of positions within the seat bore 150 of the valve 100, to selectively block or allow fluid communication between the control valve inlet 132 (FIG. 5) and two different, and fluidly isolatable from one another by the metal seat assembly 130, valve outlets 134, 136. The position of the seat assembly 130 is controlled by the relative positions of first and second stems 142, 144 extending inwardly of the seat bore 150 from a first and a second piston 138, 140, respectively, one of each of which extends inwardly of the main body 102 from the opposed ends 104, 106 thereof, respectively. Each piston 138, 140, and thus stem 142, 144, is spring biased outwardly of main body 102 by a spring assembly 230, and is also biasable, under external control pressure applied to an internal piston bore 202, inwardly of the main body 102. The inward ends 146, 148 of the stems 142, 144 are secured to the metal seat assembly 130 within the seat bore 150 at opposed sides thereof. The relative biasing forces, both pressure and spring based, are used to position the seat assembly 130 relative to the valve inlet 132 and valve outlets 134, 136.

To secure the location of the metal seat assembly 130, main body 102 includes the seat bore 150 in central seat region 108, from the opposed sides of which extend opposed piston rod bores 152, 154 which extend from the seat bore 150 through the opposed ends 104, 106 of main body 102. A cage 156, comprising a pair of opposed plates 158, 160, is received within the seat bore 150, and is configured to receive the metal seat assembly 130 therebetween and allow generally straight line path reciprocating movement of the metal seat assembly 130 therein with the opposed sides of the metal seat assembly 130 is maintained in contact with the inwardly facing surface of each of the opposed plates 158, 160, or separated therefrom by a thin meniscus of the fluid the flow of which is being controlled by the valve, formed between the seat assembly 130 and the facing surfaces of the opposed plates 158, 160. Plate 158 includes an inlet bore 164 extending therethrough and aligned with inlet passage 170 extending to the inlet 132, and plate 160 includes two outlet bores 166, 168 extending therethrough, wherein the outlet bore 166 is aligned with outlet 134 and the outlet bore 168 aligned with outlet 136. Plate 158 is secured to the innermost extending face of the seat cap by a pair of threaded fasteners (not shown), and plate 160 is secured to the base of the seat bore 150 by threaded fasteners (not shown). The location of the openings in the plates 158, 160 and the base of the seat bore 150 and innermost face of the seat cap 118 receiving the threaded fasteners provide the alignment between the inlet 132 and inlet passage, and between outlet bores 166, 168 and outlets 134, 136. In the embodiment shown in FIGS. 2 to 9 herein, the outlet bores 166, 168 are spaced apart, along the length of the internal bore of the cage 156, by approximately the diameter of the seat assembly 130, as will be further described herein. An enlarged cap bore 174 having a sealing wall surface 176 forms the opening of seat bore 150 from the main body 102. Seat cap 118 includes an extending sealing boss 178, which is received in the enlarged cap bore 174 with a sealing structure, such as a seal groove extending inwardly of the boss 178, with a sealing ring such as an O-ring, therein.

Each of the piston rod bores 152, 154 have the same configuration, and extend to the opposite ends 104, 106 of the main body 102 of the valve 100 from the internal bore of the cage 156 in seat bore 150. Each piston rod bore 152, 154 includes a reduced diameter pilot bore 180 in direct communication with the interior seat bore 150 of the cage 156, a counterbored portion 182 extending therefrom, a spring bore 184 extending therefrom, and a counterbore 186 opening from spring bore 184 and out of the opposed ends 104, 106 of the main body 102. A guide bushing 190 is disposed within the counterbored portion 182, and includes an outer cylindrical surface 192 engaged against the circumferential wall of the counterbore 182, and an inner guide bore 194. Guide bushing 190 is configured, for example, of PEEK® or Delrin®.

The open end of the piston rod bores 152, 154 are covered by end caps 110, 112. Each end cap 110, 112 has substantially the same configuration as the other, and they each include a rectangular body 200 having an internal piston bore 202 and a rectangular cap boss 204 extending therefrom. Internal piston bore 202 is aligned along its centerline with piston rod bore 152 and 154. Cap boss 204 includes a seal groove 206 extending inwardly thereof and circumferentially therearound, within which a sealing structure 208, such as an O-ring and back up rings are provided. The o ring seals the interface of the caps 110, 112 with the counterbore 186. The internal piston bore 202 of the caps 110, 112 opens into the spring bore 184 of main body. Each internal piston bore 202 is selectively pressurizable, as will be discussed further herein, to selectively bias one of the pistons 138, 140 in the direction of the main body 102.

Figure 3:
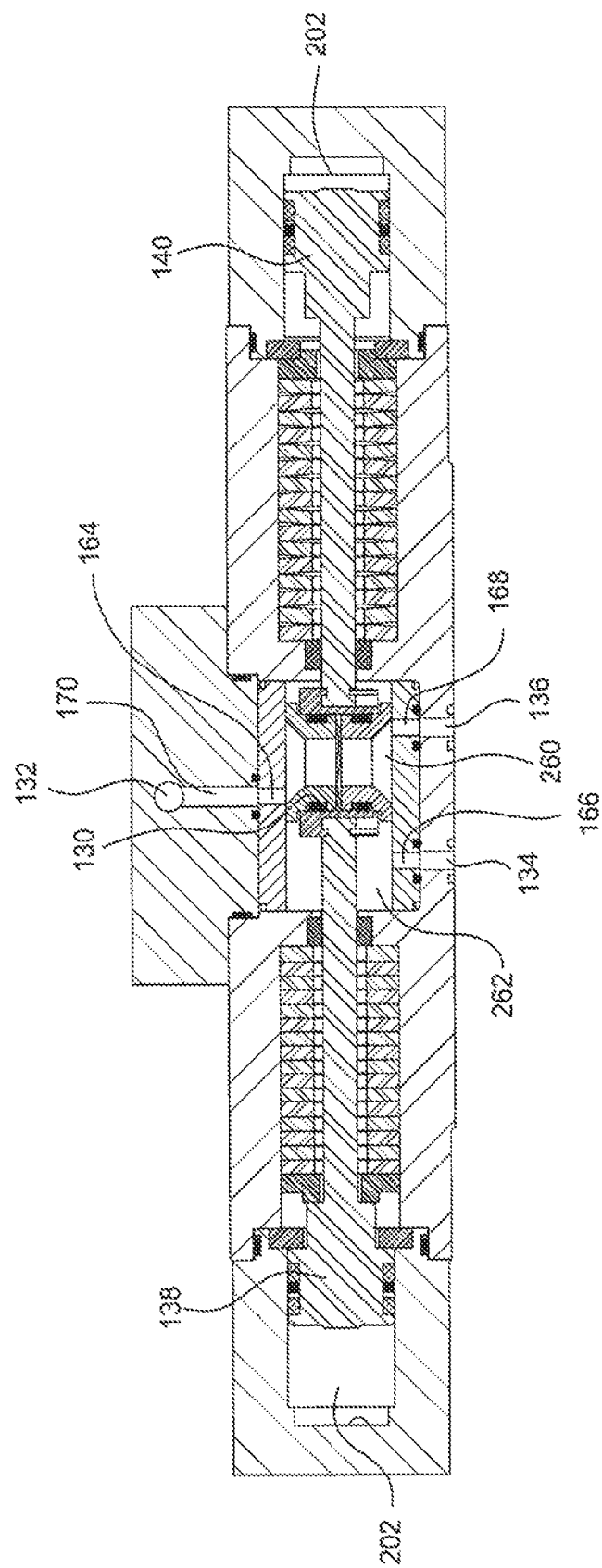
FIG. 3 is a sectional view of the valve of FIG. 1 at section 2-2 thereof, showing the valve in one of two open positions.
Figure 4:
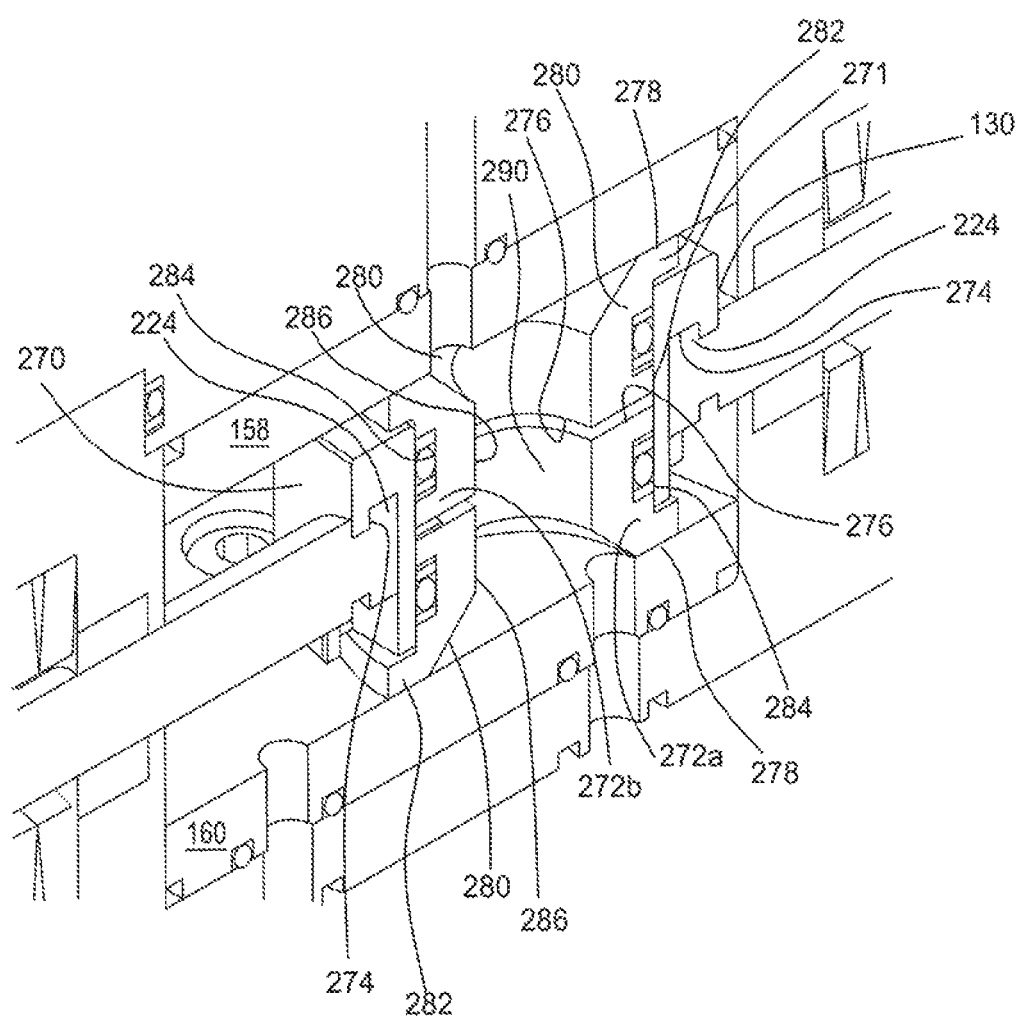
FIG. 4 is an enlarged sectional perspective view of the seat assembly and seat bore of the valve of FIG. 2.

Piston 138 and stem 142, and piston 140 and stem 144 are, in the embodiment of FIGS. 2 to 4, configured monolithically, i.e., machined or formed from a single piece of metal or plastic stock. They may also be formed as two or more pieces, wherein the piston side end of each stem 142, 144 is press fit, threaded, or otherwise fixed to its respective piston 138, 140. Each piston 138, 140 includes an outer circumferential surface 212 having a seal groove 214 extending inwardly of the circumference thereof, and a seal ring 218, such as an O-ring, received therein, and supported against extrusion by opposed elongated backing rings 220 which also act as bushings and are configured, for example, of PEEK or Delrin®. Seal ring 218 provides sealing and spacing between the outer circumferential surface 212 of the piston 138, 140, and the wall 216 of internal piston bore 202, to prevent control fluid operating on piston 138, 140 from leaking into spring bore 184. Each piston 138, 140 includes a reduced diameter boss 222, from which stems 142, 144 extend. Stems 142, 144 extend through their respective inner guide bore 194 of guide bushing 190, and the end 146, 148 of each extends inwardly of cage 156. Guide bushing 190 maintains the alignment of each stem 142, 144 with the seat assembly 130, to minimize friction and wear of the components at the connection thereof. Slightly inwardly of the ends 146, 148 of each stem, a lock groove 224 extends inwardly of the outer circumference thereof, such that an isolated head portion 226 is disposed at the end 228 thereof.

A return bias member, configured as a spring assembly 230, is received within each spring bore 184, and is configured to create an outwardly directed bias on the pistons 138, 140 tending to push them away from the seat bore 150 and thus pull the ends 146, 148 of the stems 142, 144 away from each other. As the spring force is balanced, i.e., each spring assembly 230 is configured to provide the same, or nearly the same, bias force tending to push the pistons 138, 140 from the seat bore 150, the spring assemblies 230 center the metal seat assembly 130 in the seat bore 150 when no control pressure is applied to the internal piston bores 202, thereby maintaining the valve 100 of this embodiment in a closed position. In the described embodiment, the spring assemblies 230 comprise a plurality of Belleville® springs 232 each having a center opening 234, such that each spring 232 surrounds one of the stems 142, 144. The plurality of individual Belleville® springs 232 of the spring assembly 230 may be replaced with a single coil spring, or a plurality of stacked and/or nested springs. Each Bellville® spring 232 has a convex side 236 and a concave side 238, and the convex sides of adjacent springs 232 of the plurality of springs 232 in the spring assembly 230 abut at their adjacent inner circumferences. The concave side of a first spring of the plurality of springs 232 bears against an annular spring ledge 240 extending between counterbore 182 and spring bore 184, and at the opposed end of the plurality of springs 232, a spring plate 242 having a central bore 244 through which the stem 142 or 144 extends, bears against the concave side of the last spring 232 in the plurality of springs 232, closest to the piston 138 or 140. Spring plate 242 includes an alignment recess 246 formed as a notch 246 extending inwardly of the outer circumference thereof and the piston 138, 140 facing side thereof, to form an alignment boss 248 which extends inwardly of central opening in an alignment ring 250. The alignment ring 250 is secured between the end cap 110, 112 and the wall of the opposed ends 104, 106 of the main body. Piston 138, 140 includes an annular bearing face 252 extending between the reduced diameter boss 222 and the outer circumference of the stem 142, 144, which when the piston 138, 140 is biased under control pressure in the direction of the seat bore 150, engages against the spring plate 242, as shown in FIG. 3. When neither piston bore 202 is under control pressure, the force of the springs 232 balance on either side of the seat bore 150, and the metal seat assembly 130 is centered in the seat bore 150, as shown in FIG. 3. As the pressure in the internal piston bore 202 causes piston 138 or 140 to move in the direction of the seat bore 150, the individual springs 232 of the spring assembly 230 against which the piston 138, 140 is engaging are collapsed or flattened, such that the frustroconical shape thereof is significantly shallower in profile, or even becomes flat. The alignment boss of the spring plate 242 selectively extends inwardly of the inner diameter of the alignment ring 250. The alignment ring 250 also serves to limit the travel of the spring plate 242, and thus the spring assembly 230, outwardly of the spring bore 184 in the direction of internal piston bore 202.

In FIG. 2, the valve 100 is shown in the closed center position (rest position) with the metal seat assembly 130 thereof in a centered position within the seat bore thereof, or centered with respect to the location of the inlet 132. In FIG. 3, the valve 100 is shown in one of two open positions, wherein the metal seat assembly 130 has moved to the right as shown in FIG. 3 as compared to its position in FIG. 2, and the first outlet 136 is in fluid communication with the inlet 132 and a second outlet 134 remains sealed off from the inlet 132. In operation, the metal set assembly 130 is selectively positioned relative to passages in the valve 100 by spring assemblies 230 which center the metal seat assembly 130 to isolate the valve inlet 132 from either of two outlets 134, 136 when control pressure is equal on both spring assemblies 230, such as when no control pressure is applied to an internal piston bore 202 of either end cap 110, 112. When control pressure is sufficiently unbalanced, i.e., sufficiently higher in the internal piston bore 202 associated with one spring assembly 230 with respect to the other spring assembly 230, the metal seat assembly 130 moves to allow communication between the inlet 132 and one of the outlets 134 or 136, while maintaining the isolation seal between the inlet 132 and the other outlet 134 or 136. Additionally, the construct of the metal seat assembly 130 and the relative positions of the inlet 132 and outlets 134, 136 allow for minimal interflow of fluid between the outlets 134, 136, effectively isolating each outlet 134, 136 from the other outlet 134 or 136, i.e., the first and second outlets 134, 136 are in fluid communication when the valve 100 is in the closed or rest position, but when the inlet 132 begins to communicate with one of the outlets 134, 136, the other outlet 134, 136 is isolated from the outlet in communication with inlet 132 as well as from inlet 132. Thus, the spring assemblies 23o center the metal seat assembly to maintain the valve in the closed position, except when sufficient control pressure is applied to one of the pistons 138, 140, to overcome the bias acting thereagainst by the spring assembly associated therewith, to open the valve, and the spring assemblies close the valve without the need to apply a control pressure, simply by venting the control pressure applied at one of the pistons 138, 140.

Referring to FIG. 3, the valve 100 is shown in one of two open positions, wherein inlet 132 is in fluid communication with outlet 136, and it is also isolated from outlet 134, by selective positioning of the metal seat assembly 130 with respect to the inlet bore 164 and outlet bores 166, 168. It should be appreciated that the inlet 132 can also be in fluid communication with outlet 134, and simultaneously isolated from outlet 136, by moving the metal seat assembly 130 in an equal and opposite direction as it was moved from the position thereof in FIG. 2 to the position thereof in FIG. 3. To enable the positioning of the metal seat assembly 130 at the position thereof in FIG. 3, control pressure is applied to the internal piston bore 202 associated with piston 138, and a lower pressure, or a no pressure, ambient pressure external to the valve, vented condition, is present in the internal piston bore 202 associated with piston 140. Thus, the reduced diameter boss 222 of piston 138 moves inwardly of the spring bore 184 associated therewith, and the annular bearing face 252 thereof bears against and biases spring plate 242 inwardly of the spring bore 184 to compress the springs 232. Simultaneously, the piston 140 moves inwardly of the internal piston bore 202 associated therewith, such that piston 140 is spaced away from the spring plate 242 associated therewith as shown in FIG. 3. To return the valve 100 to the rest or closed position of FIG. 2, the pressure in the internal piston bore 202 associated with piston 138 is vented to external ambient pressure, or brought to the same pressure as that of the internal piston bore 202 associated with piston 138, and the spring assembly 230 associated with piston 138 pushes the piston 138 inwardly of the internal piston bore 202 associated therewith to move the metal seat assembly 130 to the center position and thereby seal off the inlet 132 from outlet 136. As the metal seat assembly 130 becomes centered in seat bore 150, the spring force of the spring assemblies 230 bearing on the pistons 138, 140 on either side thereof comes into equilibrium or balance, and the metals seat 130 assembly comes to rest in the seat bore 150 with both outlets 134, 136 isolated from the inlet 132 by the body thereof.

Referring to FIGS. 4 to 9, the connection of the stems 142, 144 to the metal seat assembly, and details of the body of the metal seat assembly 130, are shown in detail. Metal seat assembly 130 includes an outer connection ring 270 within which are received upper and lower metal seat sleeves 272a, b. Outer connection ring 270 is generally a right annular member, having on diametrically opposed sides thereof, an undercut T-shaped slot 274 into which the head 226 of the stems 142, 144 are received to secure the connection of the stems to the opposite sides of the ring 270, and hence to the metal seat assembly 130, and an inner, generally right cylindrical, sleeve wall 271. Each metal seat sleeve 272a, b is identical, or substantially identical, in construct, and is configured as an annular monolith having first and second, opposed, annular faces 276, 278. Along the outer circumference thereof, an enlarged annular portion 280 extends radially outwardly about the circumference thereof from a generally right cylindrical smaller diameter portion 282. Thus, the annular face 278 extends along the outer surface of the enlarged annular portion 280. A seal recess 284 extends inwardly of the smaller diameter portion 282, within which a seal ring such as an O-ring, positioned between back up rings, is provided. Along the inner circumference metal seat sleeves 272a, b is provided a frustroconical wall portion 280 opening into second face 278, and a generally right cylindrical inner bore 286 extending therefrom and opening into first face 276. The smaller diameter portion 282 of each metal seat sleeve 272 is positioned into opposed sides of the sleeve wall 271, such that the enlarged annular portion 280 is positioned adjacent to an upper or lower side of the connection ring 270, such that the seal in the seal recess seals against the seal recess and the adjacent sleeve wall 271, the first annular faces 276 of the metal seat sleeves 272 face each other in the central bore of the connection ring, and an annular wave spring 290 (FIG. 4) is located therebetween to bias the metal seat sleeves 272 away from one another and into initial contact with the inwardly facing opposed surfaces of the opposed plates 158, 160. The second face 278 of each metal seat sleeve 272 is in sliding contact with the facing position of the plate 158, 160 against which it bears, and a thin layer of fluid may occur therebetween to create a hydrodynamic seal between the relative sliding surfaces of the second faces 278 and plate 158, 160 facing surfaces.

Figure 5:
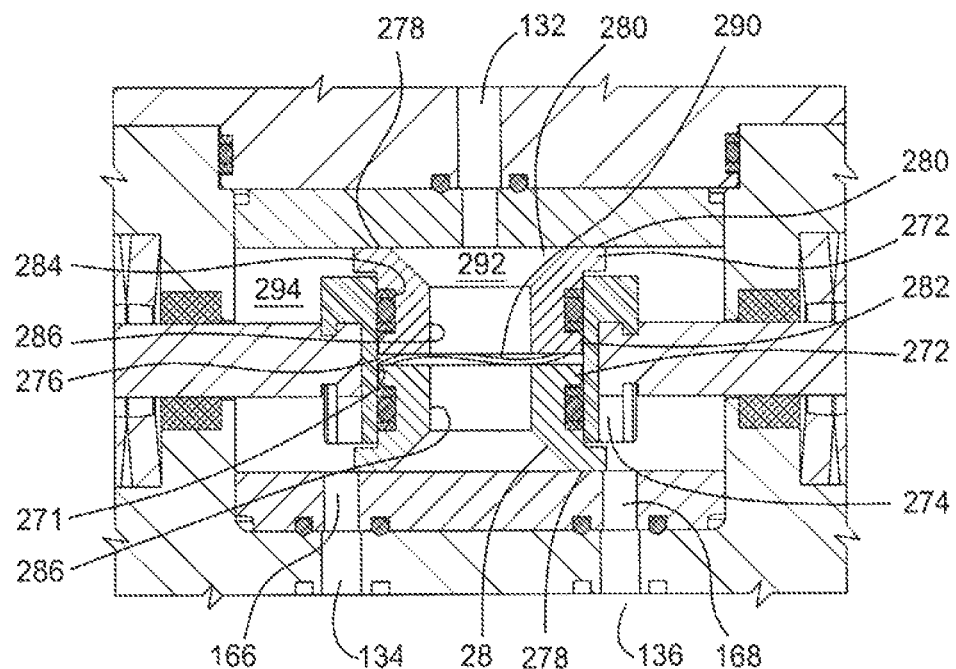
FIG. 5 is an enlarged sectional view of the seat assembly and seat bore of the valve of FIG. 2 in the closed position.
Figure 7:
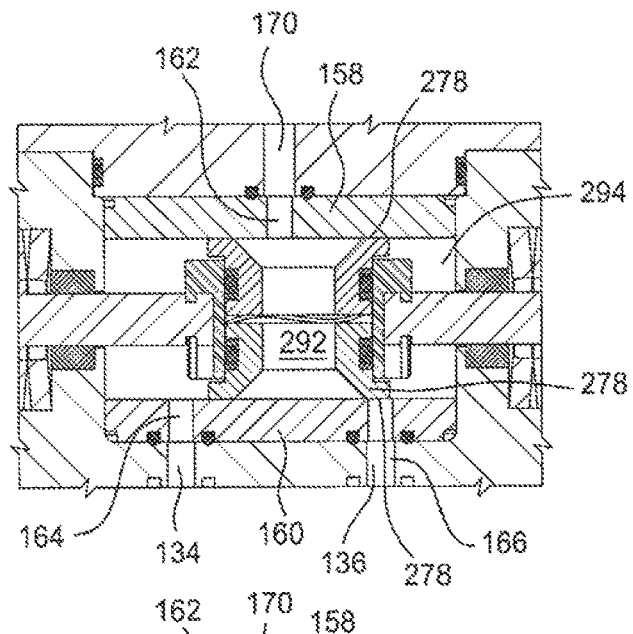
FIG. 7 is an enlarged sectional view of the seat assembly and seat bore of FIG. 6 showing the seat moved further in the opening direction but the valve remains closed.
Figure 8:
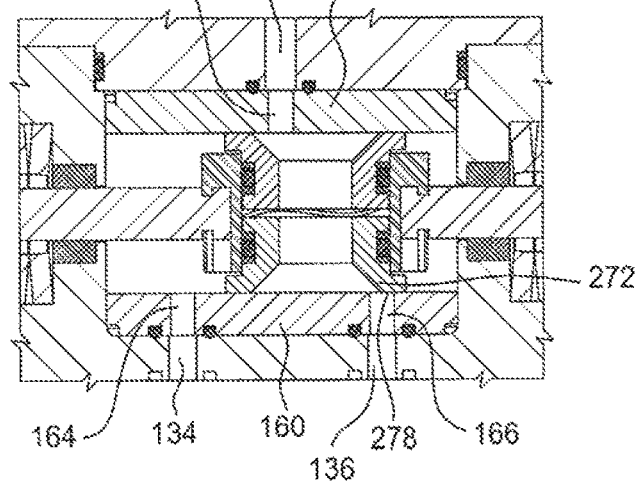
FIG. 8 is an enlarged sectional view of the valve of FIG. 7, wherein the seat has moved sufficiently to allow restricted flow of fluid between the inlet and outlet thereof.
Figure 9:
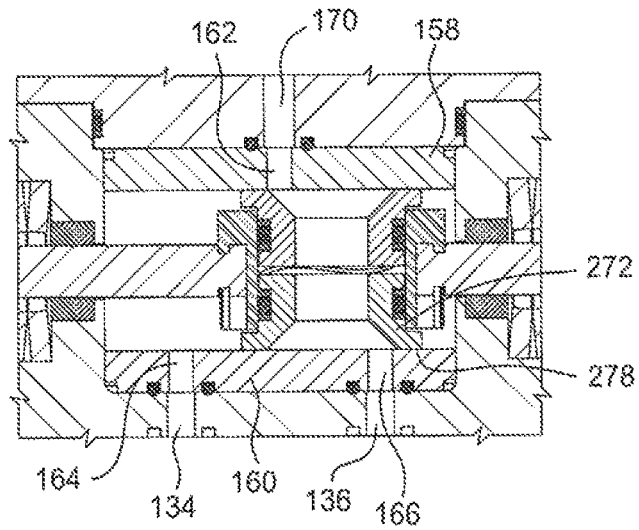
FIG. 9 is an enlarged sectional view of the valve of FIG. 8, wherein the seat has moved to one of two fully open positions.
Figure 10:
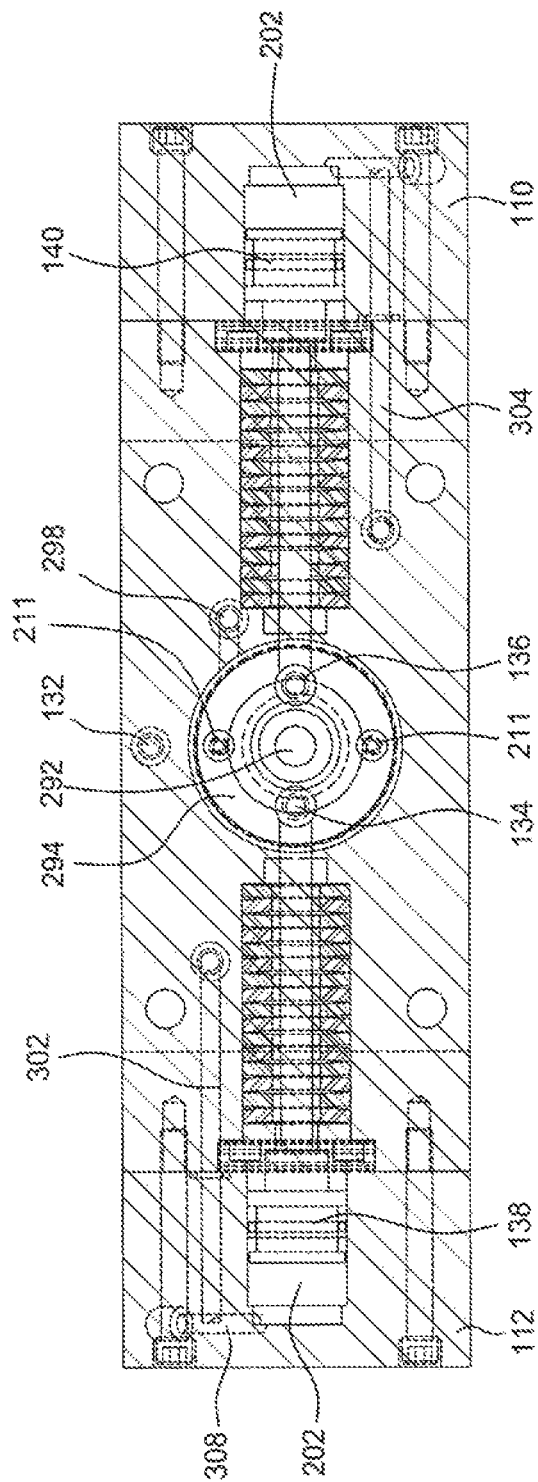
FIG. 10 is a sectional view of the valve of FIG. 1, showing the internal fluid passage routings thereof.
Figure 11:
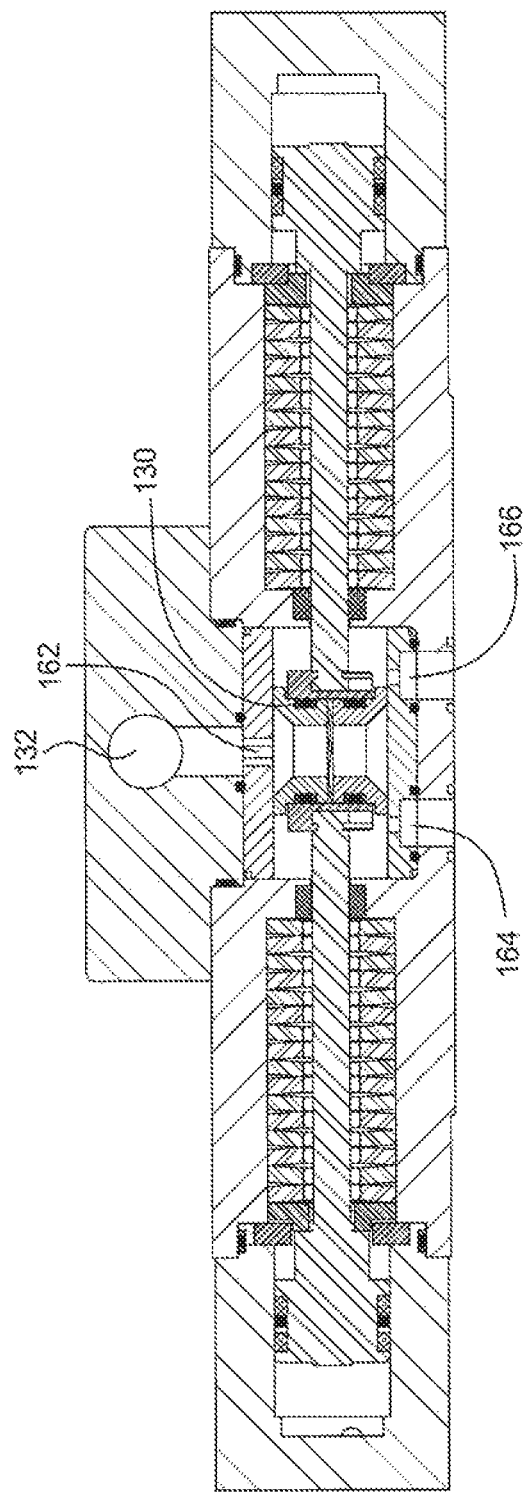
FIG. 11 is a sectional view of a of a 4-way, 3-position directional control valve, having enlarged flow capability.

Referring now to FIGS. 5 to 9, the cooperation of the plates 158, 160 and the metal seat assembly 130 in the seat bore 150 are shown as the valve moves from a closed position (FIG. 5) to one in which the inlet 132 is connected to the outlet 136 and sealed off from the outlet 134 (FIGS. 3 and 9). Referring initially to FIG. 5, where the valve 100 is in the closed position, the outer diameter of the second annular faces 278 of the metal seat sleeves 272 of the metal seat assembly 130 are approximately equal to, or slightly larger than, the minimum distance between the outlet bores 166, 168, and thus in the rest position, wherein the metal seat assembly 130 is centered in the seat bore 150, and it is also centered between, and not in a blocking position with respect to, the outlet bores 166, 168. The metal seat assembly 130 bifurcates the volume of the seat bore 150 into a first volume 292 located within the circumference of the metal seat sleeves 272 of the metal seat assembly 130, and an annular second volume 294 surrounding the metal seat assembly 130. In the closed position, the first volume 292 is in fluid communication with only inlet 132, and the second volume 294 is in simultaneous fluid communication with both outlets 134, 136 and a vent 298. (FIG. 10). The spring bore 184 pressure is balanced with the annular second volume 294 across bushing 190. The annular faces 276 of the metal seat sleeves 272 are larger in area than are the annular faces 278 thereof. As a result, inlet 132 pressure applied within the first annular volume is maintained on the facing annular faces 276 of the two metal seat sleeves 272, and thus the force applied at the interface of the annular faces 278 and the surfaces of the opposed plates 158, 160 where they are in contact is a multiple of the pressure in the first volume 292. For example, the area of the annular faces 276 is 1.5 to 3 times that of annular faces 278, resulting in a force multiplier of 1.5 to 3 times the pressure in first volume 292.

Figure 6:
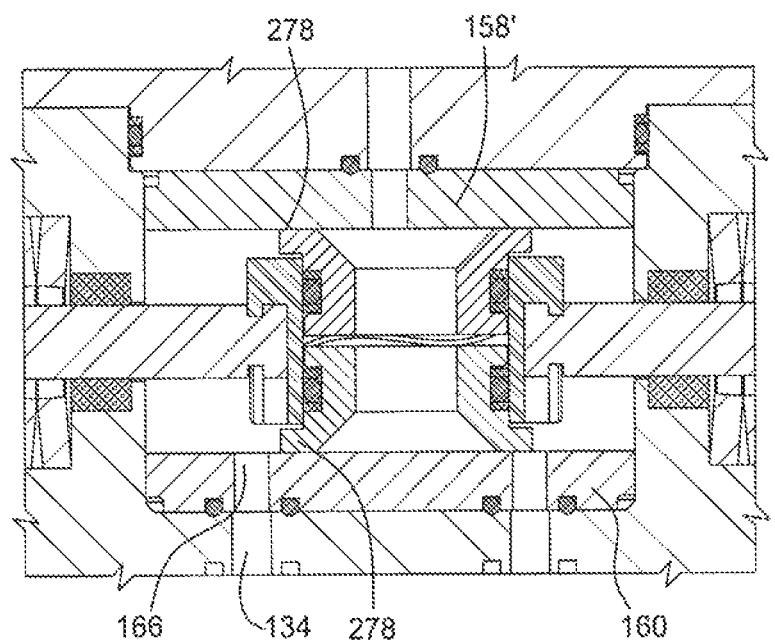
FIG. 6 is an enlarged sectional view of the seat assembly and seat bore of FIG. 5, wherein the seat has moved in an opening direction but the valve remains closed.

As pressure is applied to the internal piston bore 202 associated with piston 138 (FIG. 2), the metal seat assembly 130 begins moving within the seat bore 150, from the position thereof in FIG. 5 to the position thereof in FIG. 6. As the metal seat assembly 130 moves, the hydrodynamic seal between the relative sliding surfaces of the second annular faces 278 and the inwardly facing surfaces of plate 158, 160, and the o ring in the seal groove 284, maintains isolation between the first and second volumes 292, 294. As the metal seat assembly 130 moves to the position of FIG. 6, the second annular face 278 of the lower metal seat sleeve 272 begins to extend over, but does not yet block, the outlet bore aligned with outlet 136.

As the springs 232 of the spring assembly 230 continue to be compressed by the piston 138 moving in the direction of the seat bore 150 under the influence of the pressure in the internal piston bore 202 associated therewith, the metal seat assembly 130 moves to the position of FIG. 7, wherein the second annular face 278 of the lower metal seat sleeve 272 extends over and blocks communication of the second and the first volume 292, 294 with the outlet bore 166 aligned with outlet 136, and first and second volumes 292, 294 remain isolated with each other. However, in contrast to the position of the metal seat assembly 130 in FIGS. 5 and 6, in the position of FIG. 7, only outlet 134 is now in communication with the second volume 294. Inlet 132 remains in communication with first volume 292. Thus, outlets 134, 136 are sealed off from one another, and the inlet 132 is sealed off from communication with either outlet 134, 136, thereby preventing, or severely minimizing, interflow as the valve transitions between open and closed positions, because fluid does not flow between the first and second volumes 292, 294 as the valve seat passes over an outlet opening.

As the springs 232 of the spring assembly 230 continue to be compressed by the piston 138 moving in the direction of the seat bore 150 under the influence of the pressure in the internal piston bore 202 associated therewith, the metal seat assembly moves from the position of FIG. 7 to the position of FIG. 8. In FIG. 8, the leading edge of second annular face 278 of the lower metal seat sleeve 272 extends partially beyond the outlet bore 166 aligned with outlet 136, and the trailing edge at the intersection of the frustroconical surface and the second annular face of the lower metal seat sleeve 272 is positioned approximately half way across the width of the opening to the outlet 136, and thus the first volume begins to communicate with both inlet 132 and with the outlet bore 166 aligned with outlet 136. In this position, only outlet 134 communicates with the second volume 294, and first and second volumes 292, 294 remain isolated with each other, so that outlet 134 remains isolated from inlet 132, and also remains isolated from outlet 136.

As the springs 232 of the spring assembly 230 continue to be compressed by the piston 138 moving in the direction of the seat bore 150 under the influence of the pressure in the internal piston bore 202 associated therewith, the metal seat assembly 130 moves from the position of FIG. 8 to the valve fully open position of FIGS. 3 and 9. In this position, the trailing edge of the second annular face 278 of the lower metal seat sleeve 272 extends fully beyond the outlet bore 166 aligned with outlet 136, and first volume 292 is in full, unrestricted by the metal seat assembly, communication with both inlet 132 and with the outlet bore 166 aligned with outlet 136, only outlet 134 communicates with the second volume 294, and first and second volumes 292, 294 remain isolated from each other. In the position of the valve shown in FIGS. 8 and 9, a control fluid at the inlet 132 of the valve is communicated to a downstream component to be fluidly activated or controlled via outlet 136. As shown in FIG. 9, the largest diameter of the frustroconical walls 280 of the metal seat sleeves 272 is configured such that, when the trailing edge of the lower metal seat sleeve 272b is just past the opening bore 166, that same edge on the upper metal seat sleeve 272a is located directly adjacent to, but not blocking, the edge of the opening 162 leading to inlet 132.

To close the valve 100, the pressure in the internal piston bore 202 associated with piston 138 is vented, and the springs 232 of the spring assembly 230 associated with piston 138 bias piston 138 away from the seat bore 150 to cause the stem 142 associated therewith to pull the metal seat assembly 130 toward the center of the seat bore 150, and reestablish the valve 100 in the closed position of FIGS. 2 and 5. During this motion, because the second annular face 278 of the lower metal seat sleeve 272 is wider than the width of the outlet bore 166, fluid cannot flow from the first volume 292 to the second volume 294 as the second annular face 278 moves there past, and thus fluid interflow cannot occur, or will occur only via leakage between the upper and lower annular faces 278 and the facing surfaces of the facing plates 158, 160, or past the O-ring in the metal seat assembly 130. To prevent trapping of fluid in the annular second volume 294, and maintain the outlets 134, 136 at a vented condition when not communicated with the inlet 132, a vent passage 298 is maintained in fluid communication with the second volume 294. As discussed previously, the metal seat assembly 130 can be biased by pressure in the internal piston bore 202 associated with piston 140 to cause the metal seat assembly 130 to be positioned to allow fluid communication between the inlet 132 and outlet 134, while simultaneously fluid isolating outlet 136 from both inlet 132 and outlet 134. The architecture of the metal seat assembly 130 with respect to the span between the outlets 134, 136 and outlet bores 164, 166 causes the same operation of the valve 100 when the outlet 134 communicates with inlet 132 to first isolate outlet 134 from second volume and first volume 192, and then allow communication between inlet 132 and outlet 134 through the first volume 192. Thus no, or very minimal, interflow can occur between the outlets 134, 136 during valve opening and closing, or between the outlets 134, 136 and the inlet 132 unless the metal seat assembly 130 is purposely positioned to enable flow between the inlet 132 and one of the outlets 134, 136. Returning the valve 100 to the closed position from the position where the inlet 132 and outlet 134 are communicating through the first volume 192, the internal piston bore 202 associated with piston 140 is vented, causing the spring assembly 230 associated with piston 140 to push piston 140 inwardly of the internal piston bore 202 associated therewith, causing stem 144 to pull metal seat assembly beck to the middle or center of the seat bore 150.

Referring now to FIG. 10, the fluid supply flow paths of the valve 100 are shown. The valve includes the aforedescribed inlet 132 and outlets 134, 136, as well as a vent passage 298 maintained in fluid communication with second volume 294, and control fluid conduits 302, 304 integrally formed in the main body 102 and end caps 110, 112 of the valve. Each conduit 302, 304 extends from an inlet location 306 on the mounting side wall of the valve, in the main body 102 thereof, and extends therefrom through the main body 102, into a mating passage in end cap 110, and thence as a cross drilled passage 308 communicating with an internal piston bore 202. The cross drilled passage extends out the side wall of the cap 110, 112, and is sealed with a plug. An o ring, not shown, may extend around the passages of the conduit joining at the opposed ends 104, 106 of the end body with the caps 110, 112. Note that fasteners 211 securing the lower plate 160 to the main body 102 are spaced apart by a distance greater that the outer diameter of the second annular face 278, and this a hydrodynamic seal is maintained as the metal seat assembly moves between the fasteners 211 and the heads of the fasteners cannot interfere with the movement of the metal seat assembly 130.

To assemble valve 100, lower plate 160 is placed in the seat bore 150 and secured to the portion of the main body 102 forming the lower surface thereof with threaded or other fastening means such as fasteners 211, and the guide bushings 190 are positioned within the counterbored portion 182 of the internal piston bores 202. Springs 232 and spring plate 242 are loaded into the internal piston bores 202 of the main housing 102, and the stems 142, 144 are inserted through the springs 232, spring plate 242 and guide bushing 190 so that the lock groove 224 and end portion 226 of each stem 142, 144 extends into the seat bore 150. The metal seat assembly 130 is assembled and then lowered into the seat bore 150, such that the end portion 226 of each stem 142, 144 is received in one of the slots 274 in the metal seat assembly 130. Alternatively, only lower metal seat plate 272a is first positioned in the seat bore and generally centered therein, and then the upper metal seat portion 272b is lowered so that the end portion 226 of each stem 142, 144 is received in one of the slots 274 in the upper metal seat plate 272b. Upper plate 158 is then mounted and secured to the seat cap 118 and the seat cap 118 is secured to the main housing 102 with fasteners. Alignment rings 250 are then located over the spring plates 242, and then end caps 110, 112 are secured to the opposed ends 104, 106, such that the pistons 138, 140 are received within the internal piston bores 202. The alignment rings 250 may be secured in the counterbored portion of each end cap 110, 112 and then the end cap and ring assembly located over, and secured to, the opposed ends 104, 106 of the main body 102. To disassemble all or a part of the valve 100, the fasteners securing the one of the caps covering a component requiring service or replacement may be removed, the associated cap removed, and thus the internal components covered by that cap made accessible and easily removed if required. Because the individual components of the valve 100 are easily assembled and disassembled by securing or removing threaded fasteners holding the end caps 110, 112 and seat cap 118 thereto, and the internal components such as the piston and stem, springs, spring retainer and metal seat assembly are directly accessible upon removal of the caps 110, 112, 118, the valve 100 is easily serviced and repaired, even in the field. Additionally, because the piston bores in the main housing are mirror images, and the bushings piston and stem, springs, spring retainer, retaining ring and caps on either side of the seat bore 150 are identical, or nearly identical mirror images of each other, the number of parts of the valve is reduced, and the likelihood of misassembly in the field is significantly reduced.

Figures 12A, 12B:
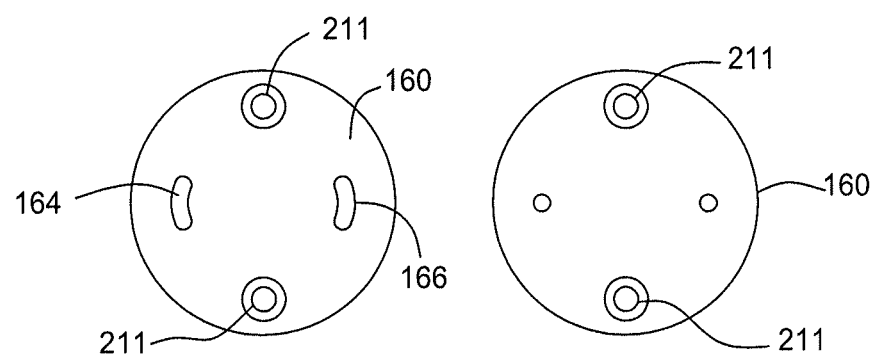
FIGS. 12a to 12d are plan views of the inlets and outlets of the valves of FIGS. 1 and 11.
Figures 12C, 12D:
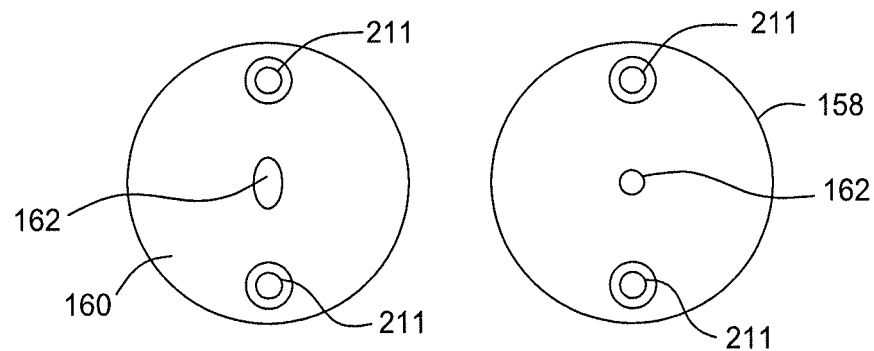

Referring now to FIGS. 11 and 12a to 12d, an alternate construct of the four position three way valve is shown. In this construct, the flow passages are increased in diameter, allowing an increased flow rate of fluid through the valve 100. The diameters of the inlet 132 and inlet bore 162 are increased, and inlet bore 162 in upper plate 158 is changed from a round opening as shown in FIG. 12d to an ovoid opening as shown in FIG. 12c. Outlets 134, 136 are also increased in size, and outlet bores 164, 166 include an enlarged, arcuate slot extending inwardly of the lower plate 160, and a smaller diameter through bore extending therefrom and through the lower plate 160 as shown in 11 and FIG. 12a, as compared to the bores 164, 166 of the standard valve shown in FIG. 12b. Again, here the closest spacing between the outlet bores 164, 166 is greater than, or equal to, the diameter of the metal seat assembly 130, and thus the valve maintains the normally closed operation, and the operation thereof is otherwise that same as that of valve 100 shown and described with respect to FIGS. 2 to 10 hereof. Additionally, the by enlarging both the diameters of the seat assembly and the spacing between, and diameter of, the outlet bores 164, 166 where they opening into the seat bore, the smaller diameter through bore portion can be further increased in diameter.

Figure 13:
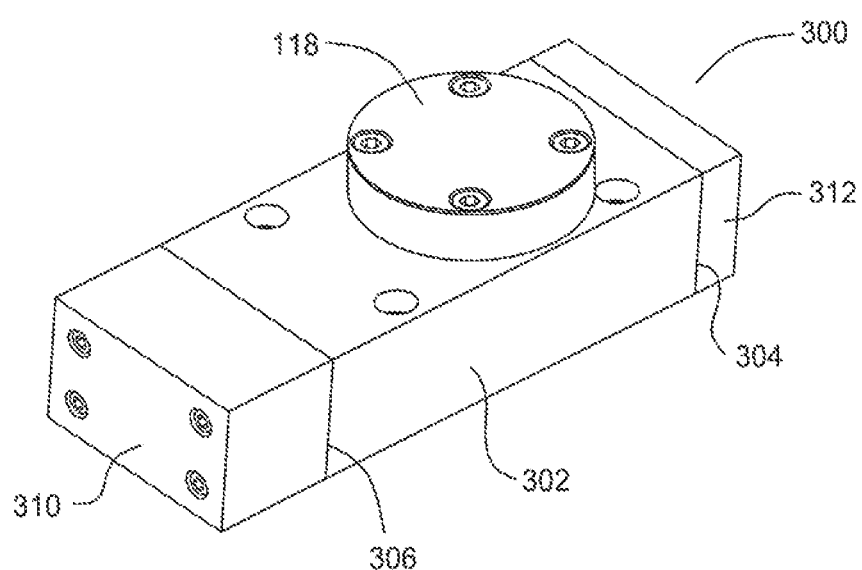
FIG. 13 is a perspective view of a 3-way, 2 position directional control valve.

Referring now to FIG. 13, an exterior view of a three position two way valve 300, which incorporates the metal seat assembly 130 and seat cap 118 and a single spring assembly 230, piston 138 and stem 142 of valve 100 is shown. The three position two way valve 300 includes a generally rectangular, in section, elongate main housing 302 having opposed side walls 304, 306, on which end caps 310, 312 are secured by threaded fasteners extending into bores thereof and into threaded bores in the main housing 302 in the same manner and construct as end caps 110, 112 are secured to main body 102 of valve 100. A seat cap 118 is secured over the seat bore 350 (FIG. 14) thereof in the same manner as it is connected to main body 102 of valve 100.

Figure 14:
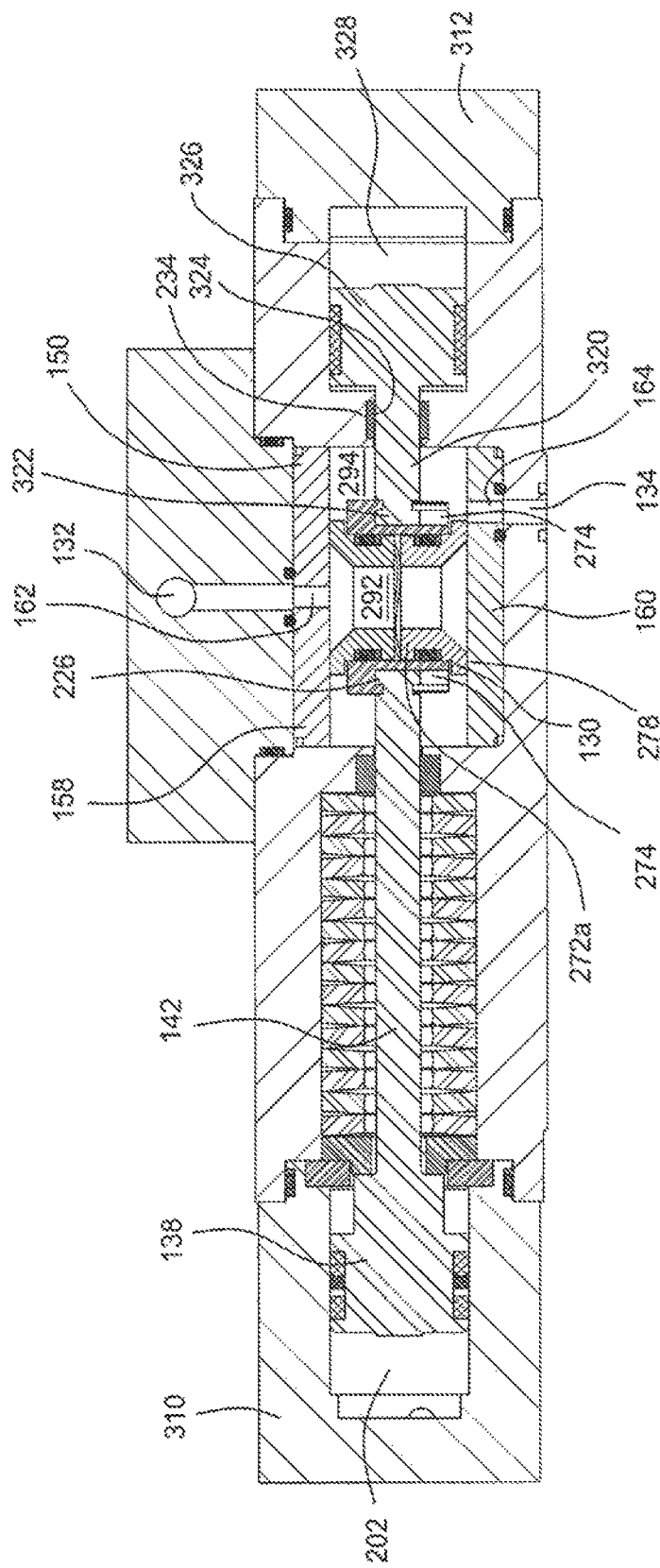
FIG. 14 is a sectional view of the valve of FIG. 13, wherein the valve is configured as a normally closed valve in the closed position.
Figure 15:
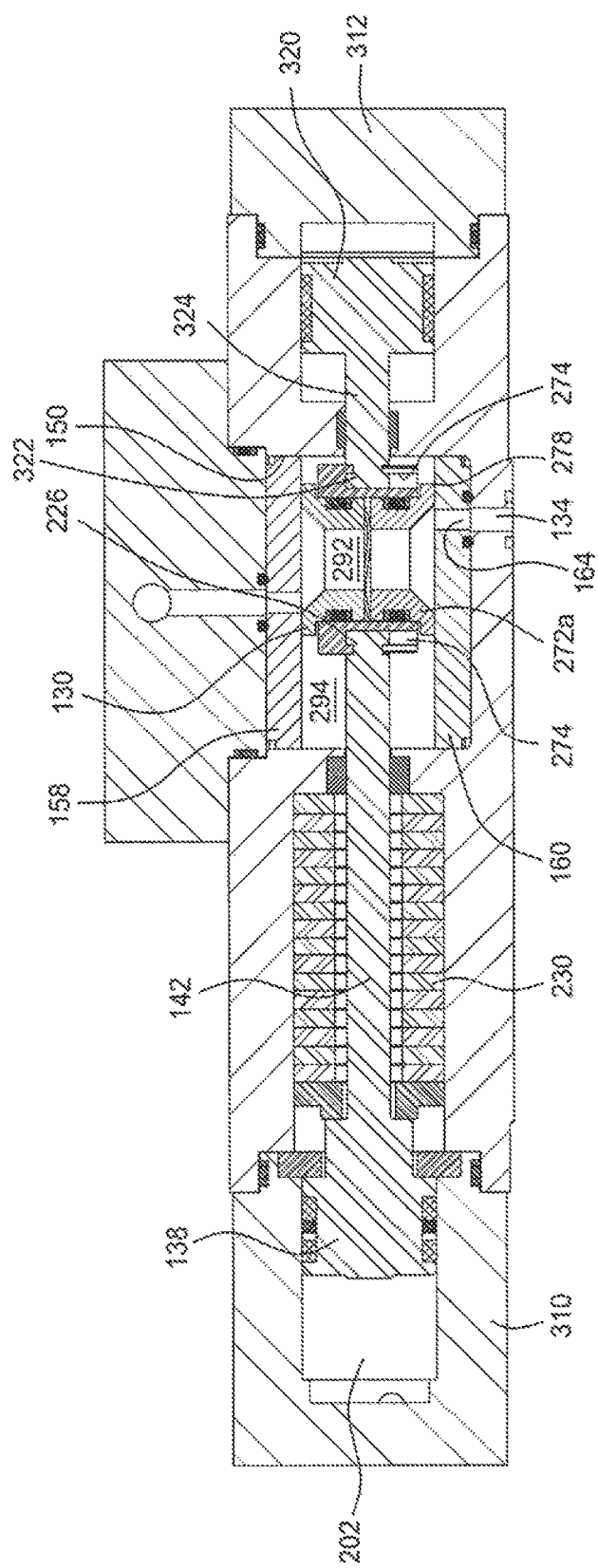
FIG. 15 is a sectional view of the valve of FIG. 13, wherein the valve is configured as a normally closed valve in the open position.

Referring to FIGS. 14 and 15, the three position two way valve 300 is configured as a normally closed valve, i.e. in the rest position when the spring assembly 230 is not under compression, the inlet is isolated from the single outlet thereof. The normally closed three position two way valve 300 includes a seat bore 150, within which the metal seat assembly 130 is provided as in the four position, three way, valve 100. However, the three position two way valve 300 includes only a single spring assembly 230, and a single actuatable stem 142, connected to the piston 138 received in the internal piston bore 202 of end cap 310 at one end thereof and extending through the spring assembly 230 and such that the end portion 226 thereof is secured in a slot 274 in the metal seat assembly 130. The piston 138 includes the seal ring and back up rings received in a seal groove thereof as in valve 100. Extending from the diametrically opposed side of the metal seat assembly 130 from the connection thereof with the stem 142 is a dummy short stem 320 secured at the end 322 thereof in the other slot 274 in the metal seat assembly 130, from which the dummy short stem 320 extends through a stem bore 324 having a bushing therein, and terminates in dummy piston 236. Dummy piston 326 is received in a vented dummy piston bore 328 formed in main housing, and an end cap 312, having a boss extending inwardly of the dummy piston bore 328 with a seal ring and backup ring assembly provided in a circumferential groove thereof to seal against the interior wall of the dummy piston bore 328, extends over, and seals the open end of, the dummy piston bore 328.

The three position two way valve 300 is configured to selectively communicate the inlet 132 thereof with a single outlet 134. Similarly to valve 100, upper plate 158 is attached by threaded fasteners to the seat cap 118 and includes a single inlet bore 162 extending therethrough, essentially in the center thereof. Lower plate 160 includes only a single outlet bore 164 aligned with the single outlet 134 extending through the base of the main body 302, which is offset from the center of the seat bore 150 in the direction of the dummy piston bore 328. As with valve 100, a first volume 292 within the circumference of the metal seat assembly 130, and a vented second volume 294 surrounding the metal seat assembly 130, is formed between the metal seat assembly 130 and the wall of the seat bore 150.

In operation, piston 236 and short stem 320 function only to guide the metal seat assembly 130 in the seat bore 150, to maintain the proper alignment thereof with respect to the inlet 132 and outlet 134 so that the metal seat assembly 130 travels in a generally straight line path across the seat bore 150. The valve of FIG. 13 is a normally closed valve, i.e., unless pressure is applied to the internal piston bore 202 associated with piston 138, first volume 292 remains isolated from outlet 134 and fluid cannot flow from inlet 132 to outlet 134. When pressure is applied to internal piston bore 202, the piston 138 moves into engagement with the spring assembly 230 and begins to compress the springs 232 thereof. Continued application of sufficient pressure to internal piston bore 202 causes the metal seat assembly 130 to move sufficiently to allow communication between inlet 132 and outlet 134 through first bore 192, i.e., the outlet 134 begins to communicate with the inlet 132 through the first volume 292 after being isolated from the second volume 294 by movement of the second annular face 278 of the lower metal seat sleeve 272a thereover and therepast. Venting of the pressure in internal piston bore 202 allows the spring assembly 230 to push piston 138 inwardly of the internal piston bore 202 without significant restriction to that motion, causing stem 142 to pull the metal seat assembly 130 back to a centered position in the seat bore 150, thereby reestablishing communication of the outlet 134 with the second volume 294 and isolating outlet 134 from first volume 292 and thus inlet 132, thereby closing the valve 300.

Figure 16:
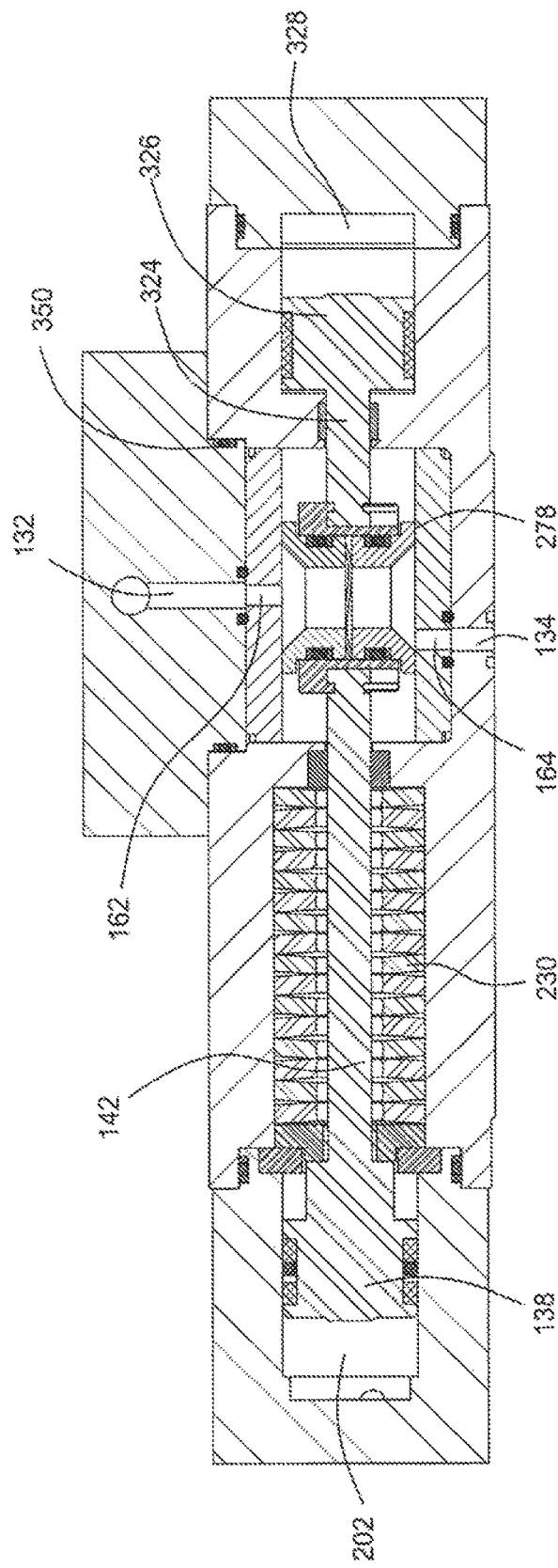
FIG. 16 is a sectional view of the valve of FIG. 13, wherein the valve is configured as a normally open valve in the open position.
Figure 17:
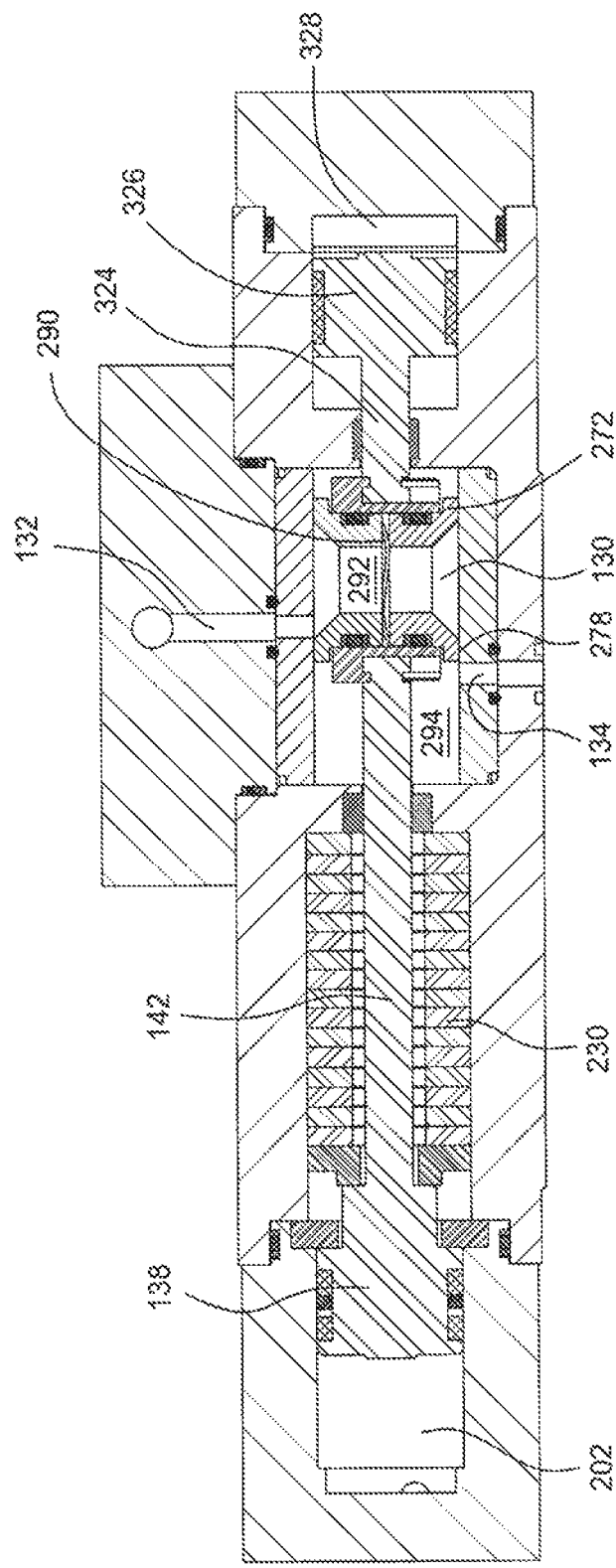
FIG. 17 is a sectional view of the valve of FIG. 13, wherein the valve is configured as a normally open valve in the open position.

Referring now to FIGS. 16 and 17, a normally open, three position two way valve 400 is shown. Valve 400 is identical to valve 300, except the positions of the inlet and outlet thereof have been modified. Specifically, outlet 134 is positioned less than one-half the diameter of the largest inner diameter of the lower metal seat sleeve 272 of the metal seat assembly 130, such that when the metal seat assembly 130 is centered in the seat bore 150, the inlet 132 communicates with the outlet 134 through the first volume 292. In this construct, when the internal piston bore 202 is vented and the spring assembly 230 thus centers the metal seat assembly 130 in the seat bore 150, the inlet 132 and outlet 134 are in fluid communication with first volume 292, and hence the valve is in an open position allowing flow from inlet 132 to outlet 134 when "at rest". The valve 400 will remain in the open position unless pressure is applied to internal piston bore 202 causing piston 138, and hence stem 142 extending therefrom, to move the metal seat assembly 130 in the direction of the dummy piston bore 328 by a sufficient distance, as shown in FIG. 16, to cause the second annular face 278 of the lower metal seat sleeve 272 to pass over and past the outlet bore 164 to isolate the first volume 292 from outlet 134 and cause outlet 134 to communicate with the vented second volume 294. Thus, a control pressure must be applied to close the valve 400.

Figure 18:
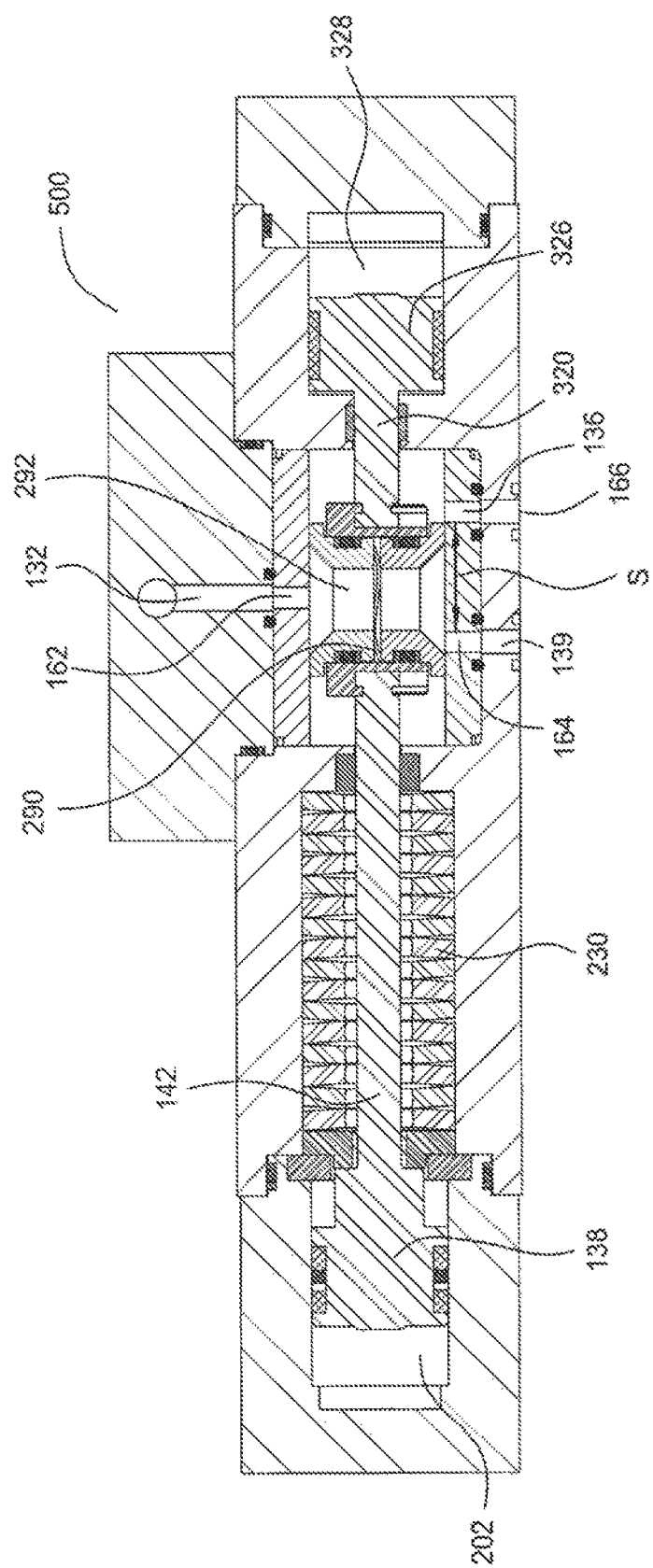
FIG. 18 is a sectional view of a four position, two way valve with the valve in one of two open positions.

Referring now to FIG. 18, a further embodiment of the valve is shown. In this embodiment, a four position, two way valve 500 is provided, wherein one of the spring assemblies 230 and interior piston bores 202 of valve 100 is replaced with a dummy piston bore 328, dummy piston 326 and dummy short stem 320 as in the valves 300 and 400. Additionally, in contrast to the valve 100, in valve 500, the spacing between the two outlets 134, 136 and associated outlet bores 164, 166 are smaller than the outer diameter of the metal seat assembly 130. Specifically, the metal seat assembly 130 is configured such that the inner diameter of the metal seat assembly 130 where the frustroconical wall portion 280 opens into second face 278 is slightly less than the closest spacing "S" between the outlets 134, 136 and outlet bores 164, 166, i.e., the span where the walls of each outlet 134, 136 are closest to each other. Additionally, the radial width of the second annular face 278 is slightly larger than the width of each outlet 134, 136.

In FIG. 18, the valve 500 is configured as a normally open valve, such that in a rest position where control pressure is not supplied to internal piston bore 202, the inlet 132 and outlet 134 are both in communication with first volume 292, and outlet 136 is in communication with second volume 294. Hence, fluid may flow in through inlet 132, through first volume 292 and out through outlet 134, and outlet 136 is vented through second volume 294 and the vent 298 (FIG. 10). To close the valve, control pressure is applied to internal piston bore 202, causing the metal seat assembly 130 to move in the direction of the dummy bore 328, such that the second annular face 278 of the lower metal seat sleeve 272 of the metal seat assembly 130 covers both of the outlet bores 164, 166, and both outlets 134, 136 are thus fluidly isolated from the first volume 292 and inlet 132, as well as from the second volume 294 and the vent 298. Additional higher pressure may be applied to the internal piston bore 202 to cause the metal seat assembly 130 to be moved further in the direction of the dummy bore 328, wherein the second annular face 278 of the lower metal seat sleeve 272 moves past the outlets 134, 136, establishing communication of the outlet 134 with second and simultaneously establishing communication of the outlet 136 with the first volume 292, allowing the inlet 132 and the outlet to communicate through first volume 292.

The normally open position of valve 500 is created by offsetting the position of the outlets 134, 136 in the same direction and at the same distance from the center of the seat bore compared to that in FIGS. 2 to 9, such that when the metal seat assembly 130 is centered in the seat bore 150 in the rest position, the outlet 134 is closer to the seat bore center and thus in communication with first volume 292, and second volume 294 is in communication with outlet 134 The valve 500 can be configured as a normally closed valve, by locating each outlet an equal, and opposite, distance from the center of the seat bore 150 and sizing the metal seat assembly 130 diameters such that the second annular face 278 of the lower metal seat sleeve 272 of the metal seat assembly 130 in the rest position, when the internal piston bore 202 is vented and the spring assembly 230 centers the metal seat assembly 130 in the seat bore 150, simultaneously covers both outlets 134, 136, and movement thereon away from, or toward, the dummy bore 328 causes one of the outlets 134 or 136 to come into communication with first volume 292 and thus communicate with the inlet 132, which the other outlet 134 or 136 comes into communication with second volume 294 and can thus be vented through vent 298.

While the foregoing is directed to embodiments of the present invention, other and further embodiments of the invention may be devised without departing from the basic scope thereof, and the scope thereof is determined by the claims that follow.

The invention claimed is:

1. A multi position directional control valve comprising;
a housing having a bore therein;
an inlet and at least one outlet extending inwardly of the bore; and
a seat assembly located in the bore and moveable between at least a first position wherein the inlet is blocked from communication with the at least one outlet by the seat assembly and a second position wherein the inlet is in fluid communication with a single outlet of the at least one outlet; wherein
the seat assembly includes at least one annular member comprising an inner diameter and an outer diameter defining an annular engagement surface, the annular engagement surface extending continuously between an inner diameter and an outer diameter of the at least one annular member wherein the entirety of the engagement surface is in the same flat plane, and the width of the annular engagement surface between the inner and outer diameters is greater than the width of an outlet at the intersection of the outlet with the bore;
wherein the at least one outlet comprises at least a first outlet and a second outlet, and the annular engagement surface of the at least one annular member of the seat assembly is selectively positionable in the first position to extend over the entire cross-sectional area of the first outlet at the opening thereof into the bore and thereby block off the occurrence of fluid flow through the outlet at least at the location thereof at the bore and simultaneously not extend over any portion of the cross-sectional area of the second outlet at the opening thereof to the bore, in the second position to extend over the entire cross-sectional area of the second outlet at the opening thereof into the bore and thereby block off the occurrence of fluid flow through the outlet at least at the location thereof at the bore and simultaneously not extend over any portion of the cross-sectional area of the first outlet at the opening thereof to the bore, and in a third position to not extend over any portion of the first outlet at the opening thereof into the bore or outlet at the opening thereof into the bore;

wherein the annular engagement surface, in the third position, is located between the opening locations of the first and second outlets into the bore.

2. The valve of claim 1, further comprising a piston having a stem extending therefrom and secured to the seat assembly, wherein the position of the piston relative to the bore determines the position of the seat assembly relative to the inlet and the at least one outlet.

3. The valve of claim 2, further comprising a pressurizable and ventable piston bore, wherein the piston is received at least partially in the piston bore and is selectively positionable with respect to the bore by the application of pressure to the piston bore;

the piston includes an outer circumferential surface and a piston rear wall and the piston bore includes an inner circumferential surface and a piston bore rear wall, and a seal extends between the inner circumferential surface and outer circumferential surfaces; and a volume of the piston bore defined by the circumferential surface of the piston bore, the piston bore rear wall of the piston bore and the piston rear wall is isolated from the portion of the stem secured to the seat assembly.

4. The valve of claim 3, further comprising a return bias member disposed between the stem and the bore.

5. The valve of claim 4, wherein the return bias member is a spring;

the seat assembly includes a slot in an outer wall thereof;
the stem includes an engagement feature received in the slot of the seat assembly.

6. The valve of claim 1, further comprising a first seal plate in the bore, wherein the first and second outlets extend through the housing and through the seal plate, and the annular engagement surface is slidingly moveable across the first seal plate.

7. The valve of claim 1, wherein the inner diameter of the annular engagement surface is equal to, or less than, the minimum spacing between the two outlets.

8. The valve of claim 1, wherein the valve is moveable across the bore by a full travel distance;

the inner and outer diameters of the annular engagement surface are disposed on opposed sides of the first and second outlets at one-half the full travel distance;

and the seat assembly comprises a second annular member, the second annular member comprising an annular engagement surface facing in a direction opposed to the annular engagement surface of the at least one annular member.

9. A multi position directional control valve comprising;
a housing having a bore therein;
an inlet and at least one outlet extending inwardly of the bore; and
a seat assembly located in the bore and moveable between at least a first position wherein the inlet is blocked from communication with the at least one outlet by the seat assembly and a second position wherein the inlet is in fluid communication with a single outlet of the at least one outlet;
a piston having a stem extending therefrom and secured to the seat assembly, wherein the position of the piston relative to the bore determines the position of the seat assembly relative to the inlet and the at least one outlet;
at least one seal plate disposed within the bore, the seal plate having a flat surface extending in the direction between the inlet and outlet of the bore, the at least one inlet and at least one outlet extending through the housing and the seal plate, the outlet, at the opening into the bore through the seal plate, having an opening area; wherein the seat assembly includes at least one annular member having an inner diameter and an outer diameter defining a annular engagement surface sized to extend fully over and thereby cover the opening area of the outlet at the opening thereof into the bore from the seal plate, the seat assembly selectively positionable in at least a first position wherein the annular engagement surface prevents fluid flow through the outlet, and a second position wherein the annular engagement surface surrounds the outlet and is spaced along the surface of the seal plate from the side wall of the outlet at the opening thereof through the seal plate wherein the at least one outlet comprises at least a first outlet and a second outlet extending through the housing and the seal plate, and the annular engagement surface is selectively positionable to extend fully over and thereby cover the opening area of the first outlet at the opening thereof into the bore and not simultaneously extend over the second outlet, and to extend fully over and thereby cover the opening area of the second outlet into the bore from the seal plate and not simultaneously extend over the first outlet; and the annular engagement surface is selectively positionable fully between the openings of the first and second outlets and not simultaneously extend over any portion on the first and second bore, while simultaneously surrounding the opening of the inlet into the bore.

10. The valve of claim 9, further comprising a pressurizable and ventable piston bore, wherein the piston is received at least partially in the piston bore and is selectively positionable with respect to the bore by the application of pressure to the piston bore.

11. The valve of claim 10, further comprising a return bias member disposed between the stem and the bore.

12. The valve of claim 11, wherein the return bias member is a spring.

* * * * *